US012637372B2

(12) United States Patent
Roes et al.

(10) Patent No.: US 12,637,372 B2
(45) Date of Patent: May 26, 2026

(54) METHOD FOR TREATING HUMAN OR ANIMAL URINE AND USES OF THE TRANSFORMED URINE OBTAINED IN PARTICULAR AS FERTILISER

(71) Applicant: TOOPI ORGANICS, Loupiac-de-Lareole (FR)

(72) Inventors: Michaël Roes, Dieulivol (FR); Pierre Huguier, Le Puy (FR)

(73) Assignee: TOOPI ORGANICS, Loupiac-de-Lareole (FR)

( * ) Notice: Subject to any disclaimer, the term of this patent is extended or adjusted under 35 U.S.C. 154(b) by 1107 days.

(21) Appl. No.: 17/760,566

(22) PCT Filed: Sep. 16, 2020

(86) PCT No.: PCT/EP2020/075796
§ 371 (c)(1),
(2) Date: Sep. 9, 2022

(87) PCT Pub. No.: WO2021/052977
PCT Pub. Date: Mar. 25, 2021

(65) Prior Publication Data
US 2022/0402834 A1 Dec. 22, 2022

(30) Foreign Application Priority Data

Sep. 16, 2019 (FR) ...................................... 1910186

(51) Int. Cl.
*C02F 3/02* (2023.01)
*C02F 1/66* (2023.01)
(Continued)

(52) U.S. Cl.
CPC ................. *C02F 3/30* (2013.01); *C02F 1/66* (2013.01); *C02F 3/02* (2013.01); *C02F 3/34* (2013.01);
(Continued)

(58) Field of Classification Search
CPC ...... C02F 3/30; C02F 1/66; C02F 3/02; C02F 3/34; C02F 9/00; C02F 2103/005;
(Continued)

(56) References Cited

U.S. PATENT DOCUMENTS 6,379,546 B1 * 4/2002 Braun ....................... C05F 3/04
210/167.3
6,773,594 B1 * 8/2004 van der Wijngaart ......................
C02F 3/1268
210/259

(Continued)

FOREIGN PATENT DOCUMENTS

CN 1765841 A 5/2006
CN 101081748 A 12/2007
(Continued)

OTHER PUBLICATIONS

English translation of WO 2015195747_A1, Dec. 23, 2015. (Year: 2015).*

(Continued)

*Primary Examiner* — Joseph W Drodge
(74) *Attorney, Agent, or Firm* — Greer, Burns & Crain, Ltd.

(57) ABSTRACT

The subject matter of the invention is a method for treating human or animal urine comprising the implementation of the following steps: —a step for acidifying the urine so that the urine has a pH of less than 6, —a urine filtration step, —a step for transforming the urine by fermentation. The invention also relates to the urine obtained and the co-products of this method, as well as the uses thereof, particularly as a fertilizing material.

34 Claims, 4 Drawing Sheets

(51) Int. Cl.

| | |
|---|---|
| *C02F 3/30* | (2023.01) |
| *C02F 3/34* | (2023.01) |
| *C02F 9/00* | (2023.01) |
| *C05C 9/00* | (2006.01) |
| *C05F 17/20* | (2020.01) |
| *C05F 17/40* | (2020.01) |
| *C05F 17/80* | (2020.01) |
| *C02F 103/00* | (2006.01) |

(52) U.S. Cl.
CPC .............. *C02F 9/00* (2013.01); *C05C 9/005* (2013.01); *C05F 17/20* (2020.01); *C05F 17/40* (2020.01); *C05F 17/80* (2020.01); *C02F 2103/005* (2013.01)

(58) Field of Classification Search
CPC .......... C02F 1/001; C02F 1/004; C02F 3/006; C02F 2103/20; C05F 3/00; C05F 17/40; C05F 3/04; C05F 17/20; C05F 17/80; C05F 17/989; C05C 9/005; Y02P 20/145
See application file for complete search history.

(56) References Cited

U.S. PATENT DOCUMENTS

| | | | | |
|---|---|---|---|---|
| 2007/0218541 | A1* | 9/2007 | Denney ................... | C02F 1/008 |
| | | | | 435/267 |
| 2014/0377829 | A1* | 12/2014 | Jarvinen .............. | C02F 3/2806 |
| | | | | 435/297.1 |
| 2024/0166571 | A1* | 5/2024 | Huguier ................... | C05F 3/00 |

FOREIGN PATENT DOCUMENTS

| | | | | | |
|---|---|---|---|---|---|
| CN | 104843938 | A | | 8/2015 | |
| CN | 108117419 | A * | 6/2018 | .............. | C05G 5/20 |
| CN | 109354350 | A | | 2/2019 | |
| EP | 3348539 | A1 * | 7/2018 | ............. | C05F 17/40 |
| KR | 20110134598 | A | | 12/2011 | |
| WO | WO-2015195747 | A1 * | 12/2015 | ........... | A01K 1/0155 |

OTHER PUBLICATIONS

English translation of publication EP_3348539, Jul. 18, 2018. (Year: 2018).*

Nian patent publication Cn 108117419A, Jun. 5, 2018 (Year: 2018).*

* cited by examiner

METHOD FOR TREATING HUMAN OR ANIMAL URINE AND USES OF THE TRANSFORMED URINE OBTAINED IN PARTICULAR AS FERTILISER

This application is a U.S. national stage application of PCT application PCT/EP2020/075796 with the international filing date of Sep. 16, 2020 claiming the benefit of priority to French Patent application FR1910186 filed Sep. 16, 2019, the entire disclosure of both applications is herein incorporated by reference in its entirety.

TECHNICAL FIELD

The invention relates to treating and adding value to human or animal urine. In particular, the subject matter of the invention is a method for treating urine and using the resulting transformed urine as well as the co-products of the method, in particular as raw materials used in the manufacturing of fertilizers.

BACKGROUND

Urine is considered to be waste that needs to be disposed of. Its current mode of disposal, for the most part through the sewer system, is problematic for waste treatment plants and is more generally related to the sustainable management of water resources. Indeed, the nitrogen and micropollutant content of urine poses algae bloom and fish feminization problems.

Human urine is known to have a proven fertilization potential for agriculture in the same way as animal urines, which are already being used by farmers. Indeed, urine is rich in nitrogen (N), phosphorus P, and potassium (K), which are the essential elements for soil and crop fertilization.

However, urine is not stable when collected. It quickly loses its properties and its NPK content, particularly through hydrolysis of the urea into ammonia, which makes its industrial use currently unsuitable and impossible.

There is consequently a need for a stable urine which meets the safety criteria of current regulations, particularly concerning the content of trace metals and pathogenic organisms, and which has properties allowing it to be used as a fertilizing material adapted for agricultural use.

SUMMARY OF THE INVENTION

By working on the treatment of urine, the inventors have developed a biological method that stabilizes and decontaminates human or animal urine and enriches it with microorganisms. The fertilizer obtained by implementing this method has a pH of less than 6 and a bacteria concentration of at least $10^6$ CFU·mL$^{-1}$.

The subject matter of the invention therefore is a method for treating human or animal urine comprising:
a step for acidifying the urine so that the urine will have a pH of less than 6,
a step for filtering the urine,
a step for transforming the urine by fermentation.

The method comprises other steps and particularly an optional step before the acidification step, which consists in collecting at least one mineral from the urine in the form of a precipitate, particularly at least one mineral chosen from nitrogen, potassium, or phosphorus. The subject matter of the invention is also the acidified urine transformed by fermentation, which can be obtained by implementing the method, and which has at least the following features: a pH of less than 6 and a bacteria concentration of at least $10^6$ CFU·mL$^{-1}$. Without implementation of the method according to the invention, the pH of the urine would naturally rise to between 8 and 9 and the transformed urine would not include bacteria, because the urine would become laden with ammonia at concentrations that are toxic to bacteria. The invention also relates to the use of such an acidified urine transformed by fermentation, in particular as a fertilizing material based on a bacterial inoculum, particularly for field crops, vegetable farming, and horticulture.

The invention also relates to the use of the co-products potentially obtained prior to the acidification step (in particular, minerals in the form of precipitates) or during the urine fermentation step (in particular, the biofilm formed during this step), particularly as a fertilizing material, a plant health product, or a biocontrol product for agricultural use.

BRIEF DESCRIPTION OF THE FIGURES

FIG. 1 shows a curve representing the results obtained for the acidification of fresh urine with lactic acid.

FIG. 2 shows a curve representing the results obtained for the acidification of stored urine with lactic acid.

FIG. 3 shows a histogram representing the results obtained within 4 weeks in terms of fresh biomass weight of the above-ground parts of corn treated with various volumes of urine according to the invention.

FIG. 4 shows a histogram representing the results obtained within 4 weeks in terms of fresh biomass weight of the roots of corn treated with various volumes of urine according to the invention.

FIG. 5 shows a histogram representing the results obtained within 4 weeks in terms of total fresh biomass weight of corn treated with various volumes of urine according to the invention.

FIG. 6 shows a histogram representing the results obtained within 4 weeks in terms of above-ground fresh biomass weight of grapevines treated with various volumes of urine according to the invention.

FIG. 7 shows a histogram representing the results obtained within 4 weeks in terms of root fresh biomass weight of grapevines treated with various volumes of urine according to the invention.

FIG. 8 shows a histogram representing the results obtained within 4 weeks in terms of total fresh biomass weight of grapevines treated with various volumes of urine according to the invention.

DETAILED DESCRIPTION OF THE INVENTION

Definitions

Figure 1:
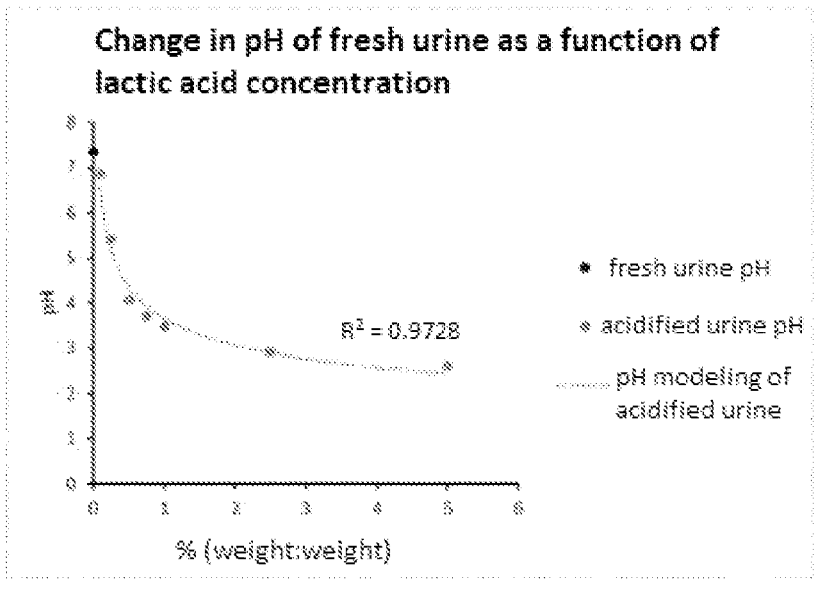
FIG. 1.

According to the invention, "acidified urine" means a urine with a pH value that has been lowered compared to the pH value of the initial urine. The pH of the acidified urine is an acidic pH.

According to the invention, "transformed urine" means a urine that has undergone a process that has transformed at least one property of the natural urine, such that it is no longer a natural product but rather a transformed product obtained from a natural product. The transformed urine is preferably a urine transformed at least by fermentation, for example lactic fermentation.

Method for Treating Human or Animal Urine

The subject matter of the invention is a method for treating human or animal urine comprising at least the implementation of the following steps:

a step for acidifying the urine so that the urine will have a pH of less than 6, a step for filtering the urine, a step for transforming the urine by fermentation.

The human or animal urine is collected by any method suitable for implementing the method of the invention.

In the case of human urine, it can be collected, in particular, from various sources such as restroom rentals, festivals, medical analysis laboratories, and communities. In the case of animal urine, it can be collected, in particular, from various sources such as livestock farmers and veterinary analysis laboratories.

The human or animal urine is collected in containers such as cans, drums, or tanks, for instance. According to one embodiment, the containers may contain one or more acids for implementing the acidification step.

As an option, the method according to the invention may potentially comprise a preliminary step before the acidification step consisting in precipitating co-products generated during the storage step prior to acidification. These co-products are preferably minerals, in particular minerals chosen from nitrogen, potassium, and phosphorus (struvite). In the particular case of collecting the struvite present in the urine prior to acidification, the method consists in adding magnesium salts in solution in order to precipitate the phosphorus, preferably at a volumetric ratio of 1:1 (Mg:P). This precipitate can be recovered by filtration using a filter with a mesh size of between 10 and 30 $\mu m$. The precipitate can then undergo various treatments, such as washing, solutionizing, pressing, and/or drying in the open air in order to obtain a material in liquid or solid form.

The acidification step of the urine is performed so that the urine has a pH of less than 6, preferably equal to or less than 5.5, and according to one embodiment equal to or less than 4. The acidification of the urine to a pH of less than 6 is necessary because it inhibits the growth of pathogens and prevents the spontaneous reaction of urea hydrolysis into ammonia, so the urine keeps its nitrogen concentration. The acidification also allows the urine to have the necessary pH for fermentation, particularly for lactic fermentation.

The pH of the urine furthermore needs to be adapted to the fermentation conditions of the microorganisms used for the fermentation. During fermentation, the pH of the urine may also need to be stabilized either by adding a base in the case of lowered pH, preferably chosen from calcium hydroxide, potassium hydroxide, sodium hydroxide, or mixtures thereof; or by adding an acid in the case of raised pH, preferably chosen from sulfuric acid, acetic acid, hydrochloric acid, phosphoric acid, nitric acid, lactic acid, or mixtures thereof.

In the case of fermentation performed with lactic bacteria:

the urine is preferably acidified to 4<pH<5 when the bacteria used for the lactofermentation step are bacteria from the Lactobacillaceae family, the urine is preferably acidified to 4.5<pH<5.5 when the bacteria used for the lactofermentation step are bacteria from the Streptococcaceae family, the urine is preferably acidified to 4.5<pH<5.5 when the bacteria used for the lactofermentation step are bacteria from the Pseudomonadaceae family, the urine is preferably acidified to 4<pH<5 when the bacteria used for the lactofermentation step are bacteria from the Enterococcaceae family, the urine is preferably acidified to 3.5<pH<4.5 when the bacteria used for the lactofermentation step are bacteria from the Leuconostocaceae family, the urine is preferably acidified to 5<pH<6 when the bacteria used for the lactofermentation step are bacteria from the Bifidiobacteriaceae family.

The acidification step can be performed by any means that obtains a urine with the desired acidic pH. In particular, the acidification step can be performed by adding to the urine at least one acid pH adjuster, preferably at least one acid and even more preferably at least one acid chosen from sulfuric acid, acetic acid, hydrochloric acid, phosphoric acid, nitric acid, and lactic acid.

In a particular embodiment of the invention, the acid used to acidify the urine is added to the urine at a concentration of between 0.1 and 10% by weight of the total weight of the mixture consisting of the urine and the acid, preferably of between 0.5 and 2.5%.

When the acidification step is performed by adding at least lactic acid to the urine, the acidification step is preferably performed by adding to the urine between 0.5 and 5% lactic acid by weight of the total weight of the urine and acid mixture, even more preferably between 1 and 2%.

When the acidification step is performed by adding at least bacteria in an acidic medium, the acidification step is preferably performed by adding to the urine between 1 and 10% of the mixture of bacteria in an acidic medium, by weight of the total weight of the urine and acidifier mixture, even more preferably between 3 and 5%. The acidification step is preferably performed when the urine is collected to avoid the hydrolysis reaction of the urea into ammonia. In order to limit the loss of nitrogen as best possible, the acidification step is performed by adding at least one acid to the container in which the urines are received or poured, before the urines are received, preferably at the bottom of the container before the urines are poured in. Once the container is full, it is preferably hermetically sealed for transport in order to limit gaseous exchanges with the open air, and the container is preferably made of plastic or metal material withstanding acid corrosion.

In a particular embodiment of the invention, the acid or acids may be replaced with a mixture of bacteria in an acidic medium so that the acidification is combined with a bacterial inoculation. Thus, in this embodiment, the acidification step of the method according to the invention is performed by adding to the urine at least one mixture of bacteria in an acidic medium so that the acidification is combined with a bacterial inoculation. Preferably, at the end of the acidification step:

the $NH_4$:total-N ratio of the urine is equal to or less than 30%, and/or the ureic-N:total-N ratio of the urine is equal to or greater than 50%, and/or the C:N ratio is equal to or greater than 2.

In one embodiment of the invention, the acidification step lasts less than 12 days, even more preferably less than 7 days, and in particular between 12 hours and 7 days.

Once acidified, the urine can be stored. Thus, the method according to the invention may comprise an additional storage step for the urine after acidification.

The urine can be stored after the acidification step and before the filtration step, or after the filtration step and before the transformation step by lactic fermentation. The urine can be stored for an undetermined amount of time, preferably for a duration equal to or less than 6 months.

Indeed, beyond 6 months the urea breaks down considerably into ammonia, which makes the medium unfavorable for microbial growth.

The storage can take place in any suitable container. The container may be the one in which the urine was collected, or any other plastic or metal container withstanding acid corrosion. Preferably, storage takes place away from light to prevent the effect of ultraviolet rays on the composition of the urines, and at ambient temperature (about 20° C.). Extreme temperatures of either less than 0° C. or more than 40° C. are unfavorable for storage because they may modify the composition of the urine. The acidified urine comprises a filtration step before or after any storage, preferably right before the transformation step by fermentation.

This filtration step must make it possible to remove undesirable particles in the urine, such as, for example, hair, pollutants in chelated form, residual salts, and any other particles that may be present (dead leaves, gravel, etc.).

The filtration step is preferably performed at least by filtration with a filter having a mesh size of between 0.1 and 80 μm. In particular, the filtration is performed at 25 μm. This eliminates undesirable particles as a function of the quality of the stored urine.

The filtration can be performed with a filter absorbing organic compounds, such as an activated charcoal filter, a chabazite filter, a zeolite filter, or any other filtration system.

After filtration, the method according to the invention comprises a fermentation step, that is, transformation through the effect of microorganisms. Preferably, the microorganisms used for the fermentation step are bacteria. These bacteria may be lactic bacteria (in this case, one refers specifically to lactic fermentation or lactofermentation) or non-lactic bacteria.

In a preferred embodiment of the invention, the urine transformation step by fermentation consists in adding to the urine at least one carbon source and at least one bacteria inoculum.

The carbon source is preferably added at a rate of 1 to 40 g·L$^{-1}$ in relation to the volume of acidified and filtered urine to be transformed. There may be various carbon sources. The source is preferably chosen from fructose, glucose, lactose, maltose, sucrose, and mixtures thereof.

The bacterial inoculum is preferably added at a rate of 0.1 to 10% by volume in relation to the volume of the mixture of the acidified and filtered urine and of the carbon source. The inoculum may be obtained in particular from a stock solution consisting of at least:

the acidified urine having a pH of less than 6, preferably a pH identical or close to that of the acidified urine that is to be transformed by fermentation, a carbon source, and at least one bacterium.

The fermentation step can be performed in particular at a temperature of between 25 and 35° C. It is preferably performed at a temperature corresponding to the optimum growth temperature of the microorganism or microorganisms used for the fermentation.

In particular, if the fermentation is a lactic fermentation, the temperature may, for example, be:

35° C. for bacteria belonging to the Lactobacillaceae family;

25° C. for bacteria belonging to the Streptococcaceae family;

30° C. for bacteria belonging to the Enterococcaceae family;

25° C. for bacteria belonging to the Leuconostocaceae family;

35° C. for bacteria belonging to the Bifidiobacteriaceae family.

In one embodiment of the invention, the fermentation step is performed for a period of at least 12 hours, preferably for a period of between 3 and 12 days. This time varies according to the microorganisms and the conditions implemented for the fermentation.

One or more bacteria can be used for the fermentation. The fermentation can therefore be performed with at least two different bacteria. They may be at least two different lactic bacteria if the fermentation is a lactic fermentation. If the fermentation is performed with one or more non-lactic bacteria, these are preferably chosen from the bacteria belonging to at least one of the following orders: Rhizobiales (in particular the Bradyrhizobiaceae, Rhizobiaceae, and Phyllobacteriaceae families), BadHales (in particular the Bacillaceae and Paenibacillaceae families), Rhodospirillales (in particular the Rhodospirillaceae family), Actinomycetales (in particular the Frankiaceae family), Burkholderiales (in particular the Burkholderiaceae family), Flavobacteriales (in particular the Flavobactericeae family), Pseudomonadales (in particular the Pseudomonaceae family).

If the fermentation is performed with one or more lactic bacteria, the fermentation is performed with at least one bacterium chosen from the bacteria of the order Lactobacillales, in particular at least one bacterium of which the family is chosen from the Lactobacillaceae, Streptococcaceae, Enterococcaceae, Leuconostocaceae, Bifidiobacteriaceae.

Different variants for implementing the fermentation step of the method according to the invention may be, for example:

using one or more bacteria from the Lactobacillaceae family at a temperature of between 30 and 35° C., preferably 35° C., for 2 to 5 days, preferably 3 days, on a urine with a pH of between 4.5 and 5.5, preferably 5.0, with added sugar, preferably lactose, of between 30 and 45 g·L$^{-1}$, preferably 40 g·L$^{-1}$, using one or more bacteria from the Streptococcaceae family at a temperature of between 20 and 30° C., preferably 25° C., for 5 to 10 days, preferably 8 days, on a urine with a pH of between 5.0 and 6.0, preferably 5.5, with added sugar, preferably glucose, of between 15 and 30 g·L$^{-1}$, preferably 20 g·L$^{-1}$, using one or more bacteria from the Enterococcaceae family at a temperature of between 25 and 35° C., preferably 30° C., for 3 to 8 days, preferably 5 days, on a urine with a pH of between 5.0 and 6.0, preferably 6.0, with added sugar, preferably fructose, of between 25 and 35 g·L$^{-1}$, preferably 30 g·L$^{-1}$.

using one or more bacteria from the Leuconostocaceae family at a temperature of between 20 and 30° C., preferably 25° C., for 8 to 12 days, preferably 10 days, on a urine with a pH of between 3.5 and 5.0, preferably 4.5, with added sugar, preferably maltose, of between 3 and 10 g·L$^{-1}$, preferably 5 g·L$^{-1}$.

using one or more bacteria from the Bifidiobacteriaceae family at a temperature of between 30 and 40° C., preferably 35° C., for 2 to 6 days, preferably 4 days, on a urine with a pH of between 5.0 and 6.0, preferably 6.0, with added sugar, preferably sucrose, of between 5 and 15 g·L$^{-1}$, preferably 10 g·L$^{-1}$.

According to one embodiment, the fermentation is performed with at least *Lactobacillus* sp. In an adapted variant, the fermentation step is performed with at least one *Lactobacillus* sp. bacterium at a temperature of between 30 and 35° C. for 10 to 12 days on a urine acidified to a pH of between 3.5 and 5.0, with added sugar, preferably sucrose, of between 20 and 25 g·L$^{-1}$.

The method according to the invention may also comprise one or more additional steps.

In particular, the method according to the invention may comprise one or more steps consisting in adding additional ingredients to the urine, such as sources of nitrogen (in ureic form, as nitrate/nitrite, or as ammonia), phosphorus and/or potassium, secondary elements (calcium and/or magnesium), or trace elements (cobalt, copper, iron, manganese, and/or zinc). Adding additional ingredients can be done at any time during implementation of the method. It is preferably done prior to the fermentation step.

According to a variant of the method, the method may include an additional step for adding at least one base to the acidified urine with the aim of obtaining an optimum pH for growing the bacteria used in the fermentation step.

The method according to the invention may therefore include a step for adding at least one base to the acidified urine. Adding the base is done so that the urine will have a higher pH than that obtained after the acidification step. Preferably, this pH is less than 6. The pH is adjusted so that the urine will have a pH suitable for growing the bacteria used to ferment the urine. Adjusting the pH to the desired value is done by modifying the concentration of the base in the urine as a function of the pH of the acidified urine, the desired pH, and the base used.

Preferably, the base used for the step of adding a base to the acidified urine can be chosen, in particular, from calcium hydroxide, potassium hydroxide, sodium hydroxide, and mixtures thereof.

This variant of the method comprising a base addition step, instead of reaching the desired pH solely by acidifying the urine, makes it possible to reach the desired pH in several steps (at least two): acidification and then addition of at least one base. Thus, regardless of the variant, with or without added base, the method according to the invention allows the pH of the urine before transformation by fermentation to have a value suitable for growing the bacteria used to ferment the urine.

The step of adding a base to the acidified urine can be performed at any time in the method after the acidification step and before the urine transformation step by fermentation.

During the fermentation, the pH of the urine may also need to be stabilized either by adding a base in the case of lowered pH, preferably chosen from calcium hydroxide, potassium hydroxide, sodium hydroxide, or mixtures thereof; or by adding an acid in the case of raised pH, preferably chosen from sulfuric acid, acetic acid, hydrochloric acid, phosphoric acid, nitric acid, lactic acid, or mixtures thereof. Thus, the method according to the invention may comprise a pH stabilization step by adding at least one base or at least one acid during the urine transformation step by fermentation. According to one embodiment, the method according to the invention may comprise a series of at least the following steps:

a step for acidifying the urine so that the urine will have a pH of less than 6,
a step for adding at least one base to the urine (the pH being higher but preferably still less than 6),
a step for filtering the urine,
a step for transforming the urine by fermentation, possibly comprising a step for stabilizing the pH by adding at least one base or one acid.

According to another embodiment, the method according to the invention may comprise a series of at least the following steps:

a step for acidifying the urine so that the urine will have a pH of less than 6,
a step for filtering the urine,
a step for adding at least one base to the urine (the pH being higher but preferably still less than 6),
a step for transforming the urine by fermentation, possibly comprising a step for stabilizing the pH by adding at least one base or one acid.

Lastly, regardless of the embodiment, the method according to the invention may possibly comprise one or more additional steps prior to acidification, during the method or after fermentation.

The urine obtained after the fermentation step is in liquid form. The method according to the invention may also comprise an additional step for concentrating the microorganisms, particularly bacteria (by any suitable means such as centrifugation, dehydration, and/or freeze-drying), so as to obtain a product in solid form. Advantageously, the method according to the invention may be implemented on an industrial scale and makes it possible to obtain a product in a few days. The method according to the invention advantageously makes it possible to add value to a natural raw material currently considered to be waste, which currently requires substantial, costly, and unsatisfactory processing.

Acidified and Transformed Urine

The subject matter of the invention is also an acidified and transformed urine which can be obtained by implementing the method according to the invention.

The acidified and transformed urine according to the invention has at least the following features:

a pH of less than 6, and
a concentration of microorganisms, preferably bacteria, of at least $10^6$ CFU·mL$^{-1}$. In one embodiment of the invention, the acidified and transformed urine also has at least one of the following features, preferably at least two, even more preferably at least three or all:
a dry matter content equal to or greater than 1%; this has the advantage of having a particularly well-suited quantity of nutrients;
a NH$_4$:total-N ratio equal to or less than 30%; this provides an optimum source of nitrogen that can be assimilated by the bacteria;
a ureic-N:total-N ratio equal to or greater than 50%; this feature provides a source of nitrogen that cannot be assimilated by the bacteria, but which frees nitrogen for plants when the transformed urine is used on plants;
a C:N ratio equal to or greater than 2; this feature provides for optimum growth of the bacteria.

The acidified and transformed urine according to the invention is a complex matrix which includes nitrogen, phosphorus, and potassium. It also contains secondary elements, such as calcium and magnesium, as well as trace elements, such as cobalt, copper, manganese, and zinc.

The acidified and transformed urine according to the invention may be in liquid form. It is then stored in any suitable container, such as bottles, cans, drums, or tanks, preferably made of opaque plastic or metal withstanding acid product corrosion.

The acidified and transformed urine may also be in solid form, in particular in the form of granules, pellets, or powder. The granules and/or pellets can be obtained from mineral media such as zeolites and perlite, as well as from organic media such as bat or bird guano.

In addition, the acidified and transformed urine according to the invention preferably complies with current regulations concerning safety, particularly concerning the content of metal trace elements and pathogenic organisms.

Use of Acidified and Transformed Urine According to the Invention

The subject matter of the invention is also the use of the acidified and transformed urine according to the invention, in particular of the acidified and transformed urine obtained by implementation of the method according to the invention, as a fertilizing material.

Indeed, thanks to its advantageous features, the acidified and transformed urine according to the invention can be used as a fertilizing material for any type of plant, including field crops, and regardless of the culture medium (compost, potting soil, coir fiber, etc.), in particular:

for field crops, particularly cereals or grapevines,
in produce farming, either for fruits or vegetables,
in horticulture, for any type of plant, particularly when starting seeds.

The use according to the invention preferably occurs before sowing or during the first weeks of growth of the plants.

It can also be used in combination with other fertilizing materials, such as mineral and/or organic fertilizers as well as amendments such as compost, in order to improve the absorption of minerals and/or to improve the final quality of the fertilizing material.

In one embodiment of the invention, the acidified and transformed urine is used to stimulate the growth of plants, particularly by stimulating growth in the vegetative phase by means of growth factors ("Plant Growth Promoting Factors") produced by the microorganisms present in the acidified and transformed urine, in particular by the bacteria.

For its use:

when the acidified and transformed urine is liquid, it is preferably diluted in water. For field applications, the recommended usage dose of liquid product is between 5 and 50 L/ha diluted in 100 to 500 L of water. For other applications, such as for potted plants, the liquid product is used at a rate of 5 to 50 mL per liter of water, when the transformed urine is solid, it is preferably applied directly to the soil. For field applications, the recommended usage dose of solid product is between 0.5 and 5 kg/ha. For other applications, such as for potted plants, the solid product is used at a rate of 0.5 to 5 g per plant.

Thus, the product according to the invention can be used in small quantities to achieve a strong effect on plant growth.

Advantageously, the fertilizing material according to the invention comes from a natural product. The method thereof does not involve any solvents. It is not in any way hazardous to humans or the environment.

Use of Co-Products of the Urine Transformation Method

The subject matter of the invention is also the use of co-products obtained when implementing the method according to the invention.

Indeed, co-products are generated during the storage step before acidification and during the fermentation step, and in particular:

before acidification: minerals, in particular minerals chosen from nitrogen, potassium, and phosphorus (struvite), during the fermentation step: surface bacterial biofilm. The surface bacterial biofilm is produced by the bacteria during the fermentation. It is composed in particular of exopolysaccharides. This surface film can be collected thanks to a scraper provided with a filter having a mesh size of between 1 and 10 μm. The biofilm can then undergo various treatments, such as washing, solutionizing, pressing, and/or drying in the open air in order to obtain a material in liquid or solid form.

These co-products have features that advantageously allow them to be used as fertilizing material, plant health products, biocontrol products, or any other agricultural use.

EXAMPLES

The invention will now be illustrated by examples.

Example 1: Method for Transforming a Urine According to the Invention with Lactic Acid and *Lactobacillus* sp An example of a method according to the invention comprises the following steps:

deposit 1% by weight lactic acid at the bottom of the plastic container (for 100 L of urine, add 1 kg lactic acid, i.e., about 0.83 L);

add the urine at the initial pH (6.5 to 7) to the plastic container (for 0.83 L lactic acid, fill to 100 L);

the mixture has a pH of 4.0; it can be stored under these conditions for up to 6 months in a hermetically sealed plastic container at ambient temperature and away from light;

filter the acidified urine with a filter made of nylon or plastic material with a 25 μm mesh size;

to the acidified and filtered urine add 1% by volume of a *Lactobacillus* sp. inoculum (1 L for 100 L of acidified urine) and 25 $g \cdot L^{-1}$ sucrose (white sugar) at 34° C. for 10 days with continuous stirring (between 50 and 100 rpm);

collect the acidified and transformed urine after recovery of the co-products and particularly the formed biofilm.

The inoculum was first obtained as follows:

acidify 10 L of urine to reach a pH equal to or less than 4 by adding 1% by weight lactic acid (100 g of acid for 10 L);

filter the acidified urine with a filter having a 25 μm mesh size;

add 100 mg of the strain of *Lactobacillus* sp. kept in concentrated liquid form;

add 25 $g \cdot L^{-1}$ sucrose (white sugar);

ferment at 30° C. for 5 days;

the final concentration of bacteria obtained is on the order of $10^6$ $CFU \cdot mL^{-1}$.

The acidified and transformed urine obtained has the following features:

a pH equal to or less than 4, a concentration of *Lactobacillus* sp. of $10^6$ to $10^7$ $CFU \cdot mL^{-1}$, a $NH_4$:total-N ratio of 10%, a ureic-N:total-N ratio of 60%, a C:N ratio of 3.

Example 2: Method for Transforming a Urine According to the Invention with Lactic Acid and *Lactobacillus* sp An example of a method according to the invention comprises the following steps:

deposit 1% by weight lactic acid at the bottom of the plastic container (for 100 L of urine, add 1 kg lactic acid, i.e., about 0.83 L);

add the urine at the initial pH (6.5 to 7) to the plastic container (for 0.83 L lactic acid, fill to 100 L);

the mixture has a pH of 4.0; it can be stored under these conditions for up to 6 months in a hermetically sealed plastic container at ambient temperature and away from light, filter the acidified urine with a filter made of nylon or plastic material with a 25 μm mesh size;

to the acidified and filtered urine add 1% by volume of a *Lactobacillus* sp. inoculum (1 L for 100 L of acidified urine) and 10 g·L$^{-1}$ lactose at 30° C. for 15 days with continuous stirring (50 to 100 rpm);

collect the acidified and transformed urine after recovery of the co-products and particularly the formed biofilm.

The inoculum was first obtained as follows:

acidify 10 L of urine to reach a pH equal to or less than 4 by adding 1% by weight lactic acid (100 g of acid for 10 L);

filter the acidified urine with a filter having a 25 μm mesh size;

add 100 mg of the strain of *Lactobacillus* sp. kept in concentrated liquid form;

add 25 g·L$^{-1}$ sucrose (white sugar);

ferment at 30° C. for 5 days;

the final concentration of bacteria obtained is on the order of 10$^6$ CFU·mL$^{-1}$.

The acidified and transformed urine obtained has the following features:

a pH equal to or less than 4, a concentration of *Lactobacillus* sp. of 10$^6$ to 10$^7$ CFU·mL-1, a NH$_4$:total-N ratio of 10%, a ureic-N:total-N ratio of 60%, a C:N ratio of 3.

Example 3: Method for Transforming a Urine According to the Invention with Nitric Acid and *Bifidiobacterium bifidum*

An example of a method according to the invention comprises the following steps:

deposit 0.5% by weight nitric acid at the bottom of the plastic container (for 100 L of urine, add 0.5 kg nitric acid, i.e., about 0.36 L);

add the urine at the initial pH (6.5 to 7) to the plastic container (for 0.36 L nitric acid, fill to 100 L);

the mixture has a pH of 4.0; it can be stored under these conditions for up to 6 months in a hermetically sealed plastic container at ambient temperature and away from light;

filter the acidified urine with a filter made of nylon or plastic material with a 25 μm mesh size;

add to the acidified and filtered urine 1% by volume of a *Bifidiobacterium bifidum* inoculum (1 L for 100 L of acidified urine) and 20 g·L-1 glucose at 34° C. for 10 days with continuous stirring (50 to 100 rpm);

collect the acidified and transformed urine after recovery of the co-products and particularly the formed biofilm.

The inoculum was first obtained as follows:

acidify 10 L of urine to reach a pH equal to or less than 4 by adding 0.5% by weight nitric acid (50 g of acid for 10 L);

filter the acidified urine with a filter having a 25 μm mesh size;

add 100 mg of the strain of *Bifidiobacterium bifidum* kept in concentrated liquid form;

add 20 g·L$^{-1}$ of glucose;

ferment at 30° C. for 5 days;

the final concentration of bacteria obtained is on the order of 10$^6$ CFU·mL$^{-1}$.

The acidified and transformed urine obtained has the following features:

a pH equal to or less than 4, a concentration of *Bifidiobacterium bifidum* of 10$^6$ to 10$^7$ CFU·mL$^{-1}$, a NH$_4$:total-N ratio of 10%, a ureic-N:total-N ratio of 60%, a C:N ratio of 3.

Example 4: Method for Transforming a Urine According to the Invention with Struvite Recovery, Lactic Acid, and *Lactobacillus* sp An example of a method according to the invention comprises the following steps:

collect the urine in a hermetically-sealed plastic container without prior addition of acid so that the urine has a pH equal to or greater than 8;

separately prepare a magnesium sulfate (MgSO$_4$) solution of between 100 and 150 g·L$^{-1}$ and add it to the non-acidified urine at a rate of 1% by volume (1 L for 100 L);

stir at 50-100 rpm for 30 minutes, then allow to rest for 12 to 24 hours;

filter the added urines through a filter with a 10 μm mesh size in order to separate the urines from the struvite collected in the filter;

add 5% by weight lactic acid to the filtered urine after recovery of the struvite, which has an initial pH of 8-9 (for 100 L of urine, add 5 kg lactic acid, i.e., about 4.15 L);

the mixture has a pH of 4.0; it can be stored under these conditions for up to 6 months in a hermetically sealed plastic container at ambient temperature and away from light;

filter the acidified urine with a filter made of nylon or plastic material with a 25 μm mesh size;

to the acidified and filtered urine add 1% by volume of a *Lactobacillus* sp. inoculum (1 L for 100 L of acidified urine) and 25 g·L-1 sucrose (white sugar) at 34° C. for 10 days with continuous stirring (between 50 and 100 rpm);

collect the acidified and transformed urine after recovery of the co-products and particularly the formed biofilm.

The inoculum was first obtained as follows:

acidify 10 L of urine to reach a pH equal to or less than 4 by adding 1% by weight lactic acid (100 g of acid for 10 L);

filter the acidified urine with a filter having a 25 μm mesh size;

add 100 mg of the strain of *Lactobacillus* sp. kept in concentrated liquid form;

add 25 g·L$^{-1}$ sucrose (white sugar);

ferment at 30° C. for 5 days;

the final concentration of bacteria obtained is on the order of 10$^6$ CFU·mL$^{-1}$. The acidified and transformed urine obtained has the following features:

a pH equal to or less than 4, a concentration of *Lactobacillus* sp. of 10$^6$ to 10$^7$ CFU·mL$^{-1}$, a NH$_4$:total-N ratio of 10%, a ureic-N:total-N ratio of 60%, a C:N ratio of 3.

Example 5: Method for Transforming a Urine According to the Invention with Lactic Acid, Sodium Hydroxide, and *Lactobacillus* sp, with pH Stabilization During Fermentation An example of a method according to the invention comprises the following steps:

deposit 1% by weight lactic acid at the bottom of the plastic container (for 100 L of urine, add 1 kg lactic acid, i.e., about 0.83 L);

add the urine at the initial pH (6.5 to 7) to the plastic container (for 0.83 L lactic acid, fill to 100 L);

the mixture has a pH of 3 due to variations having to do with the source of the urines;

add 0.5% by weight sodium hydroxide in order to reach a pH of 4 (add 0.25 L liquid sodium hydroxide for 100 L acidified urine at pH 3);

the urine can be stored in a hermetically-sealed plastic container at ambient temperature and away from light, filter the acidified urine with a filter made of nylon or plastic material with a 25 μm mesh size;

to the acidified and filtered urine add 1% by volume of a *Lactobacillus* sp. inoculum (1 L for 100 L of acidified urine) and 10 g·L$^{-1}$ lactose at 30° C. for 15 days with continuous stirring (50 to 100 rpm);

measure and adjust the pH with sodium hydroxide in order to stabilize at 5.5 for the entire duration of the fermentation;

recover the acidified and transformed urine after recovery of the co-products and particularly the formed biofilm.

The inoculum was first obtained as follows:

acidify 10 L of urine to reach a pH equal to or less than 4 by adding 1% by weight lactic acid (100 g of acid for 10 L);

filter the acidified urine with a filter having a 25 μm mesh size;

add 100 mg of the strain of *Lactobacillus* sp. kept in concentrated liquid form;

add 25 g·L$^{-1}$ sucrose (white sugar);

ferment at 30° C. for 5 days;

the final concentration of bacteria obtained is on the order of 10$^6$ CFU·mL$^{-1}$.

The acidified and transformed urine obtained has the following features:

a pH equal to or less than 4, a concentration of *Lactobacillus* sp. of 10$^6$ to 10$^7$ CFU·mL$^{-1}$, a NH$_4$:total-N ratio of 10%, a ureic-N:total-N ratio of 60%, a C:N ratio of 3.

Test Results

Evaluation of the Quantity of Lactic Acid to be Added to Fresh Urines (pH=7)

The purpose of this test is to evaluate the effect of lactic acid on the pH of fresh urines in order to reach optimum pH levels for bacterial growth.

The test was done with 1 L of urine having been stored for less than 2 hours. A range of lactic acid concentrations was tested by weight in relation to the weight of urine, which are as follows: 0.1%; 0.25%; 0.5%; 0.75%; 1%; 2.5% and 5%.

The results are shown in FIG. 1, which shows the pH variation of the fresh urine as a function of the lactic acid concentration. One can see that adding 0.1% lactic acid acidifies the urine, and that adding 0.25% obtains a pH of less than 6. A pH of 4 is obtained after adding 0.5% to 0.75% lactic acid.

Evaluation of the Quantity of Lactic Acid to be Added to Stored Urines (pH=9)

The purpose of this test is to evaluate the effect of lactic acid on the pH of stored urines in order to reach optimum pH levels for bacterial growth.

The test was done with 1 L of urine having been stored for 15 days in a hermetically-sealed container.

A range of lactic acid concentrations was tested by weight in relation to the weight of urine, which are as follows: 0.5%; 1%; 2%; 3%; 4%; 5%, 10%, and 20%.

Figure 2:
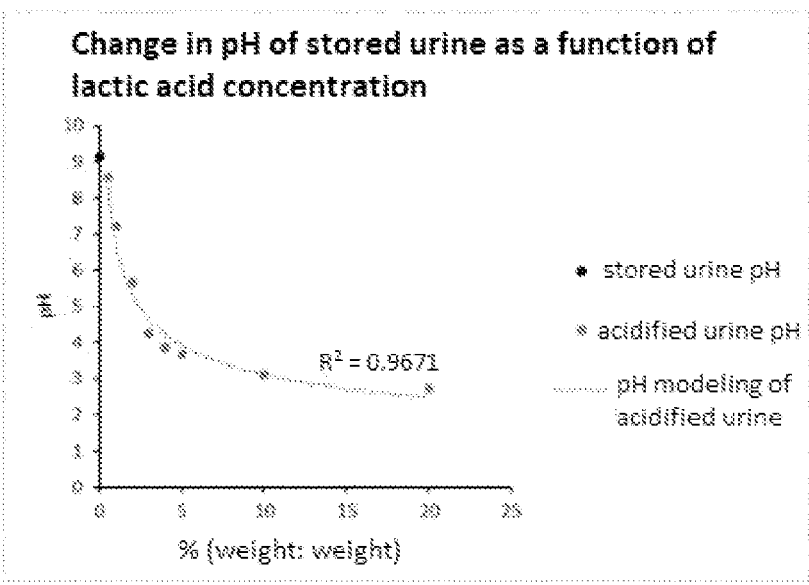
FIG. 2.

The results are shown in FIG. 2, which shows the pH variation of the stored urine as a function of the lactic acid concentration. One can see that the stored urine has a higher pH than the fresh urine and that a higher concentration of lactic acid is required to obtain a pH of less than 6, i.e., between 1 and 2%. A pH of 4 is obtained after adding 4% lactic acid.

Demonstration of the Effectiveness of the Invention on the Growth of Corn Plants The purpose of this test is to demonstrate the effectiveness of an acidified and transformed urine according to the invention as a fertilizing material.

The test was conducted under controlled conditions with the product according to the invention of example 1.

The experimental design of the test is described by following:

Corn plants starting from seed

Duration: 4 weeks

Medium: coir fiber

6-L pots; 400 g of dry medium per pot

Hydration: 80% of the water holding capacity (WHC=700%)

Modes: negative control (water) noted T; positive control (water+mineral fertilizer NPK 10-40-20 at 0.5 mL·L$^{-1}$) noted TE; product according to the invention of example 1 at 1 mL·L$^{-1}$, 5 mL·L$^{-1}$, 10 mL·L$^{-1}$, 50 mL·L$^{-1}$ 3 plants/modes Effect criteria: fresh above-ground, root, and total biomass.

Figure 3:
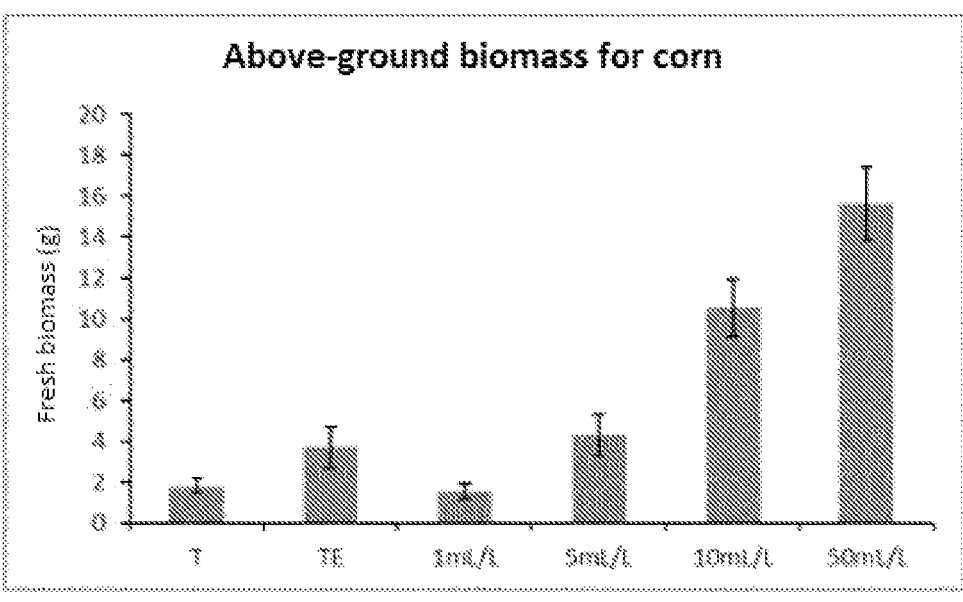
FIG. 3.
Figure 4:
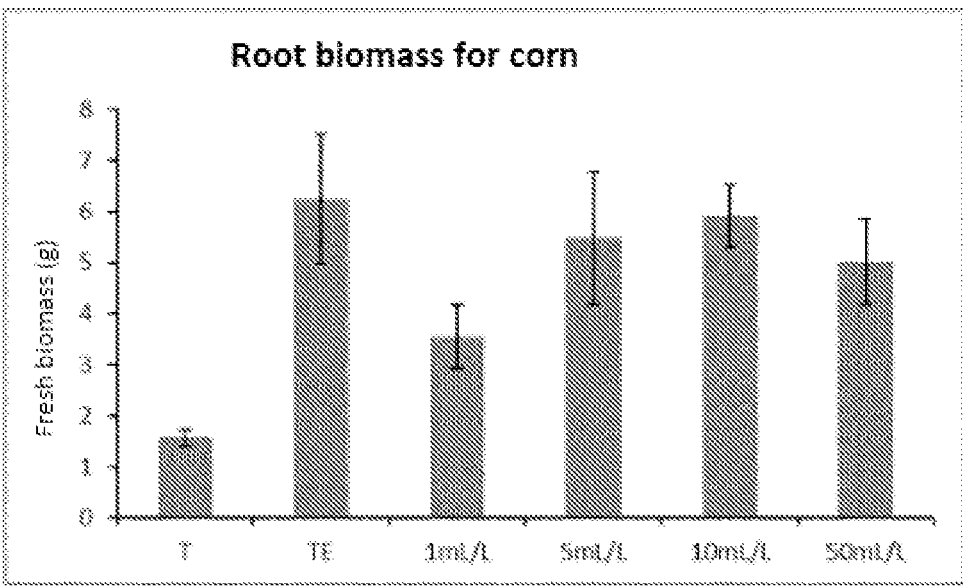
FIG. 4.
Figure 5:
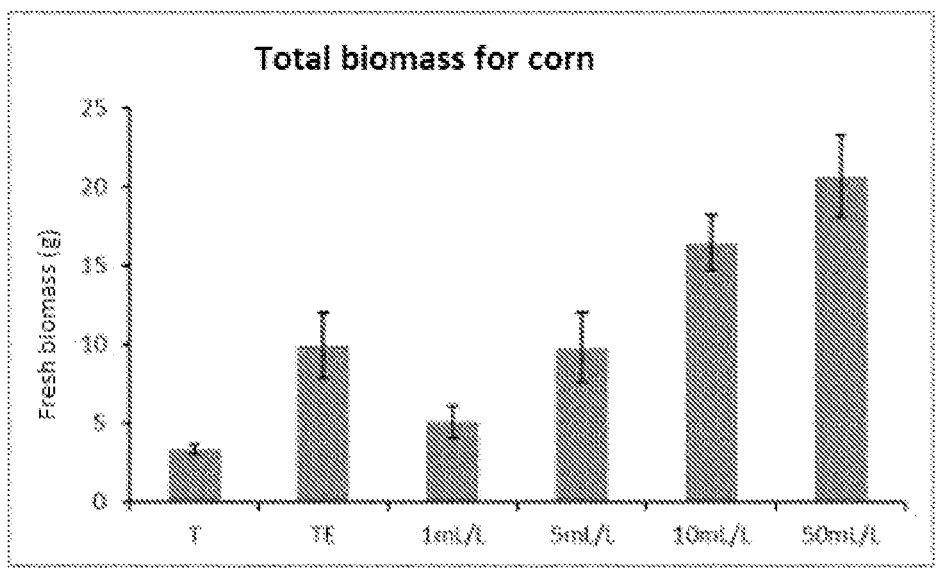
FIG. 5.

The results are given in FIG. 3 (Evaluation of the effect of the urine, after transformation according to the method, on the fresh above-ground biomass of corn), FIG. 4 (Evaluation of the effect of the urine, after transformation according to the method, on the fresh root biomass of corn), and FIG. 5 (Evaluation of the effect of the urine, after transformation according to the method, on the fresh total biomass of corn).

One can see that the acidified and transformed urine according to the invention improves the growth of the treated plants to a greater degree than the positive control.

Demonstration of the Effectiveness of the Invention on the Growth of Young Grapevines The purpose of this test is to demonstrate the effectiveness of an acidified and transformed urine according to the invention as a fertilizing material.

The test was conducted under controlled conditions with the product according to the invention of example 1.

Experimental Design:

Young grapevines from grafts

Duration: 4 weeks

Medium: compost

15-L pots; 5000 g of dry medium per pot (10 L)

Hydration: 80% of the water holding capacity (WHC=35%)

Modes: negative control (water); 5 mL·L$^{-1}$, 50 mL·L$^{-1}$ and water stress (at 50 mL·L$^{-1}$; hydration/2 over the duration of the test in relation to the control)

6 plants/modes

Effect criteria: fresh above-ground, root, and total biomass after 4 weeks.

Figure 6:
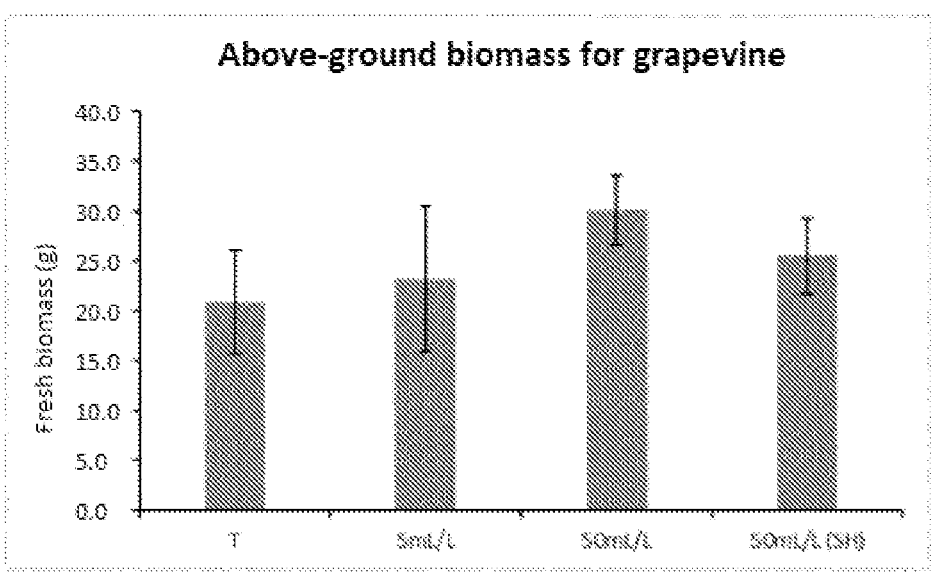
FIG. 6.
Figure 7:
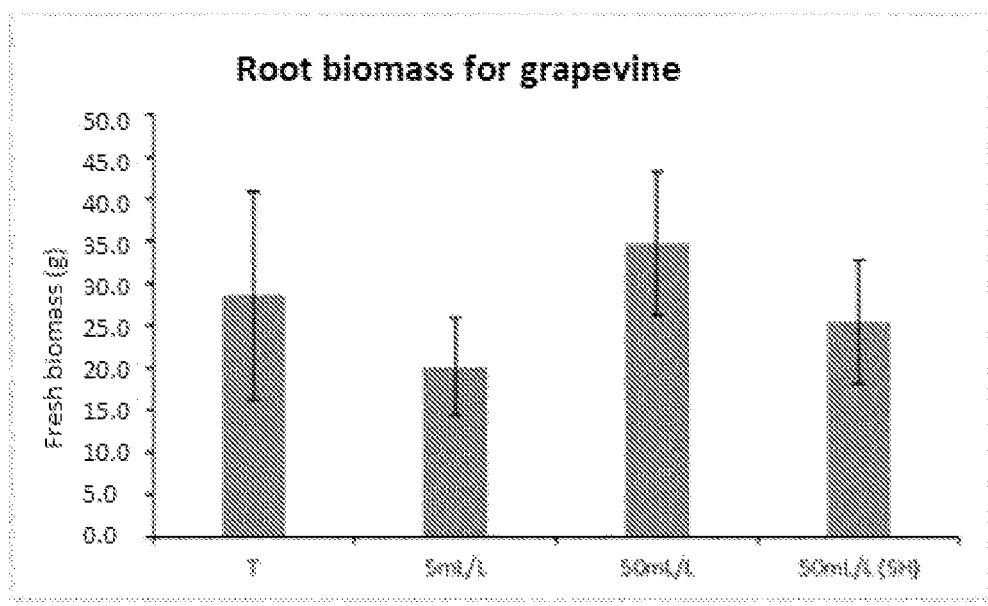
FIG. 7.
Figure 8:
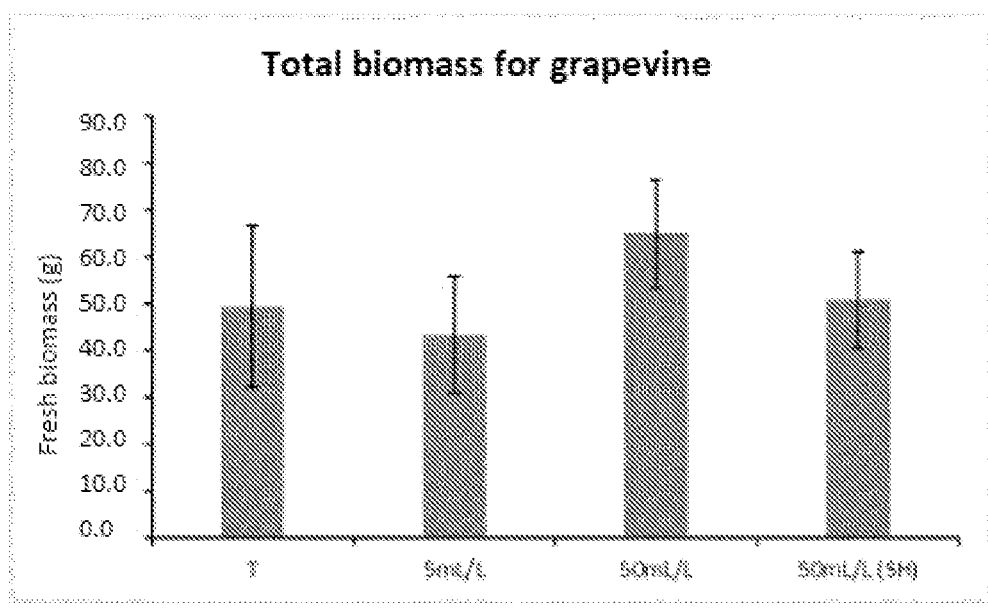
FIG. 8.

The results are given in FIG. 6 (Evaluation of the effect of the urine, after transformation according to the method, on the fresh above-ground biomass of grapevines (WS: water stress)), FIG. 7 (Evaluation of the effect of the urine, after transformation according to the method, on the fresh root biomass of grapevines (WS: water stress)), and FIG. 8 (Evaluation of the effect of the urine, after transformation according to the method, on the fresh total biomass of grapevines (WS: water stress)).

One can see that the acidified and transformed urine according to the invention improves the growth of the treated plants to a greater degree than the control.

The invention claimed is:

1. A method for treating a human or animal product consisting of urine characterized in that the method comprises at least the following steps:
    (i) acidifying the urine to a pH of less than 5.5,
    (ii) filtering the urine following step (i); and
    (iii) transforming the urine by fermentation following step (iii).

2. The method according to claim 1, characterized in that the acidification step (i) is performed by adding to the urine at least one acid chosen from sulfuric acid, acetic acid, hydrochloric acid, phosphoric acid, nitric acid, and lactic acid.

3. The method of claim 2, characterized in that the at least one acid is added at a concentration of between 0.1 and 10% by weight of the total weight of mixture of the urine and the at least one acid.

4. The method of claim 1, characterized in that the acidification step (i) is performed by adding to the urine between 0.5 and 5% lactic acid by weight of a total weight of a mixture of the urine and lactic acid.

5. The method of claim 1, characterized in that the acidification step (i) is performed by adding at least one acid to a container in which the urines is received, prior to reception of the urines.

6. The method of claim 1, characterized in that the acidification step (i) is performed by adding to the urine a mixture of bacteria in an acidic medium so that the acidification is combined with a bacterial inoculation.

7. The method of claim 1, characterized in that, after the acidification step (i) and before the urine transformation step (iii) by fermentation, the method comprises a step for adding at least one base to the acidified urine so that the urine has a pH higher than that obtained after the acidification step, but still less than 6.

8. The method of claim 7, characterized in that the at least one base is chosen from calcium hydroxide, potassium hydroxide, sodium hydroxide, and mixtures thereof.

9. The method of claim 1, characterized in that the pH of the urine before transformation by fermentation (iii) is adjusted to a value suitable for the growth of bacteria used for fermentation of the urine.

10. The method of claim 1, characterized in that the urine is stored after the acidification step (i) and before the filtration step (ii), or after the filtration step (ii) and before the transformation step by fermentation (iii).

11. The method of claim 1, characterized in that the urine, after the acidification step (i), is stored for a period of 6 months or less.

12. The method of claim 11, wherein step (ii) for filtering the urine is performed with a filter having a mesh size of between 0.1 and 80 μm.

13. The method of claim 1, characterized in that step (ii) for filtering the urine is performed with a filter absorbing organic compounds, wherein the filter is selected from the group consisting of an activated charcoal filter, a chabazite filter, and a zeolite filter.

14. The method of claim 1, characterized in that the urine transformation step by fermentation (iii) comprises adding to the urine at least one carbon source and at least one bacteria inoculum.

15. The method of claim 14, characterized in that the at least one carbon source is added at a rate of 1 to 40 g·L$^{-1}$ in relation to a volume of the urine to be transformed.

16. The method of claim 14, characterized in that the at least one carbon source is chosen from fructose, glucose, lactose, maltose, sucrose, and mixtures thereof.

17. The method of claim 14, characterized in that the at least one bacterial inoculum is added at a rate of 0.1 to 10% by volume in relation to a volume of a mixture of the urine and the at least one carbon source.

18. The method of claim 17, characterized in that the at least one bacterial inoculum is obtained from a stock solution comprising an acidified urine having a pH of less than 6, a carbon source, and at least one bacterium.

19. The method of claim 1, characterized in that the transformation step by fermentation is performed at between 25 and 35° C.

20. The method of claim 1, characterized in that the transformation step by fermentation is performed for a duration of between 3 and 12 days.

21. The method of claim 1, characterized in that the fermentation is a lactic fermentation.

22. The method of claim 1, characterized in that the fermentation is performed with at least one bacterium chosen from the bacteria belonging to the order Lactobacillales.

23. The method of claim 1, characterized in that the fermentation is performed with at least one bacterium chosen from Lactobacilluseae, Streptococcaceae, Enterococcaceae, Leuconostocaceae, Pseudomonadales, and Bifidiobacteriaceae.

24. The method of claim 1, characterized in that the fermentation is performed with at least *Lactobacillus* sp.

25. The method of claim 1, characterized in that the fermentation is performed with at least two different bacteria.

26. The method of claim 1, characterized in that the fermentation step comprises a step for stabilizing the pH by adding at least one base or acid.

27. Acidified, filtered and fermentation-transformed urine, obtained by implementing the method according to claim 1, characterized in that the acidified and fermentation-transformed urine has at least the following features: a pH of less than 6, and a microorganism concentration of at least 10$^6$ CFU·mL$^{-1}$.

28. Acidified and transformed urine according to claim 27, characterized in that it has a bacteria concentration of at least 10$^6$ CFU·mL$^{-1}$.

29. The acidified and transformed urine according to claim 27, characterized in that the acidified and transformed urine also has at least one of the following features:
    a dry matter content equal to or greater than 1%,
    a NH$_4$:total-N ratio equal to or less than 30%,
    a ureic-N:total-N ratio equal to or greater than 50%, and
    a C:N ratio equal to or greater than 2.

30. The acidified and transformed urine according to claim 27, characterized in that the acidified and transformed urine is in liquid form or in solid form.

31. A method of fertilizing plants comprising applying the acidified and transformed urine according to claim 27 as a fertilizing material.

32. A method of stimulating plant growth comprising applying the acidified and transformed urine according to claim 27 to stimulate plant growth.

33. The method according to claim 31, wherein the acidified and transformed urine is diluted in water at a rate of 1 to 50 mL of liquid acidified and transformed urine per liter of water.

34. A method comprising providing one or more co-products obtained in the fermentation step when the method according to claim 1 is implemented, comprising at least one of: a fertilizing material, a plant health product, or a bio-control product.

* * * * *